US012241602B1

(12) United States Patent
Kay et al.

(10) Patent No.: US 12,241,602 B1
(45) Date of Patent: Mar. 4, 2025

(54) ARTICULATED LIGHTING CHANNEL

(71) Applicant: PureEdge Lighting LLC, Chicago, IL (US)

(72) Inventors: Gregory L. Kay, Chicago, IL (US); Samuel Welu, Chicago, IL (US)

(73) Assignee: Pure Edge Lighting LLC, Chicago, IL (US)

( * ) Notice: Subject to any disclaimer, the term of this patent is extended or adjusted under 35 U.S.C. 154(b) by 0 days.

(21) Appl. No.: 18/450,249

(22) Filed: Aug. 15, 2023

(51) Int. Cl.
*F21S 4/00* (2016.01)
*F21S 4/22* (2016.01)
*F21V 21/30* (2006.01)

(52) U.S. Cl.
CPC ................ *F21S 4/22* (2016.01); *F21V 21/30* (2013.01)

(58) Field of Classification Search
CPC .................................. F21S 4/22; F21V 21/30
See application file for complete search history.

(56) References Cited

U.S. PATENT DOCUMENTS 11,635,177 B1 * 4/2023 Kay ........................ F21S 8/026 362/235
2018/0320840 A1 * 11/2018 Machlis ................ F21V 17/002

FOREIGN PATENT DOCUMENTS

EP 4339507 A1 * 3/2024 ................ F21S 4/22

* cited by examiner

*Primary Examiner* — Gerald J Sufleta, II
(74) *Attorney, Agent, or Firm* — Bishop Diehl & Lee, Ltd.

(57) ABSTRACT

A lighting system having a plurality of linking sections to form an articulated channel is described. Each linking section includes a first side wall, a second side wall, and a base wall positioned between the first side wall and second side wall to form a U-shape. A first end of each first side wall and each second side wall pivotably connects to the second end of a first side wall and second side wall, respectively, of an adjacent linking section to align the U-shape and form a channel. An LED strip positioned along the base wall within the channel of the plurality of linking sections provides a light source. A flexible diffuser is positioned within the channel above the LED strip.

16 Claims, 11 Drawing Sheets

ARTICULATED LIGHTING CHANNEL

TECHNICAL FIELD OF THE INVENTION

The present invention relates to recessed channel lighting. More specifically, the invention relates to an articulated recessed lighting channel capable of vertical curvature.

BACKGROUND OF THE INVENTION

Lighting is an important feature when designing or creating a work environment or living space. It is not enough that the lighting provides sufficient illumination to an area. Lighting and lighting fixtures have an aesthetic function as well. When done properly, lighting can be dynamic and flow as a user moves within the space. A commonly used permanent lighting design is recessed lighting where fixtures are recessed within a surface. The most popular recessed lights are circular, known as can lights, used in a ceiling surface. However, recessed channel lighting is used in ceilings and walls as well.

For example, U.S. Pat. No. 11,635,177 to Kay et al., titled "Recessed Curved Channel Lighting System" and issued Apr. 25, 2023, illustrates a recessed channel lighting system which is capable of curving within the plane of the surface. The unique linking members of the '177 patent allow the system to be curved, left and right, to create unique flowing lighting patterns, so long as the surface is flat.

Clearly, recessed channel lights are very different than track lighting in that they are installed, for example, into a hollow opening—usually a continuous channel—in a ceiling or wall surface (i.e., wall board). When installed, it appears that light is shining from the channel in the surface. Typically, little if any of the actual recessed lighting fixture is observable.

But not all desired lighting surfaces are flat—e.g., columns, arches, dome ceilings, and the like. Before the inventive lighting system of the '177 patent, recessed lights—being fixed light sources which cannot be readily moved without some skilled electrical re-wiring and surface patching—was often used strictly as an accent to highlight another feature of a space. Another drawback with many recessed lighting systems is that they require joists to be notched or altered in some way to accommodate the recessed fixture, which typically extend across joists. The cutting of ceiling or wall joists is time-consuming and, in many cases, an undesirable option.

The present invention provides a lighting system without the aesthetic drawbacks of prior lighting systems and without the lighting and flat surface installation limitations of standard recessed lights. By providing a customizable curvable lighting system, aesthetics are significantly improved. The present lighting system can be installed without exposure of unsightly brackets and tracks and without the need to notch or otherwise alter existing studs.

Until the invention of the present application, these and other problems in the prior art went either unnoticed or unsolved by those skilled in the art. The present invention provides a recessed channel lighting system which is capable of multiple configurations in a curved surface without sacrificing design, style or affordability.

SUMMARY OF THE INVENTION

There is disclosed herein an improved recessed channel lighting system which avoids the disadvantages of prior devices and systems while affording additional structural and operating advantages.

Generally speaking, the disclosed lighting system is comprised of a plurality of linking sections. Each linking section comprises a first side wall and a second side wall, with each first and second side wall having a first end and a second end, and a base wall positioned between the first side wall and second side wall to form a U-shape. In the preferred embodiment, the first end of each first side wall and each second side wall pivotably connects to the second end of a first side wall and second side wall, respectively, of an adjacent linking section to align the U-shape and form a channel. An LED strip positioned along the base wall within the channel of the plurality of linking sections provides a light source.

In specific embodiments, the recessed channel lighting system further comprises a flexible diffuser positioned within the channel above the LED strip.

In other specific embodiments, a first flange is attached perpendicularly to an outside surface of the first side wall of each linking section. Also, a second flange may be attached perpendicularly to an outside surface of the second side wall of each linking section.

In specific embodiments, adjacent linking sections are pivotable about an axis perpendicular to the first side wall and second side wall.

In specific preferred embodiments, the first end of each of the first side walls and the second side walls has a first complementary edge and the second end of each of the first side walls and the second side walls has a second complementary edge, and the first complementary edge and second complementary edge of adjacent linking sections cooperatively limit pivoting between adjacent linking sections in a first direction to within a range of from 5 to 15 degrees measured from an aligned position. Preferably, the first complementary edge and the second complementary edge of adjacent linking sections cooperatively limit pivoting between adjacent linking sections to 10 degrees measured from an aligned position.

In still other specific preferred embodiments, the first end of each of the first side walls and the second side walls has a third complementary edge and the second end of each of the first side walls and the second side walls has a fourth complementary edge, and the third complementary edge and fourth complementary edge of adjacent linking sections cooperatively limit pivoting between adjacent linking sections in a second direction opposite the first direction to within a range of from 5 to 15 degrees measured from an aligned position. Preferably, the third complementary edge and fourth complementary edge of adjacent linking sections cooperatively limit pivoting between adjacent linking sections is 10 degrees measured from an aligned position.

In other specific preferred embodiments, the second end of each first side wall and each second side wall comprises an overlapping portion which conceals the first and second complementary edges.

A linkable section for a recessed channel lighting system, embodiments of which are described above, is also set forth in the present disclosure.

Generally speaking, the linkable section comprises a first side wall and a second side wall, with each first and second side wall having a first end and a second end, and a base wall positioned between the first side wall and second side wall to form a U-shape. Wherein the first end of each first side wall and each second side wall is configured to pivotably connect to the second end of a first side wall and second side wall, respectively, of another linkable section to align the U-shape and form a channel.

These and other aspects of the invention may be understood more readily from the following description and the appended drawings.

BRIEF DESCRIPTION OF THE DRAWINGS

For the purpose of facilitating an understanding of the subject matter sought to be protected, there are illustrated in the accompanying drawings, embodiments thereof, from an inspection of which, when considered in connection with the following description, the subject matter sought to be protected, its construction and operation, and many of its advantages should be readily understood and appreciated.

DETAILED DESCRIPTION OF THE INVENTION

Figure 1:
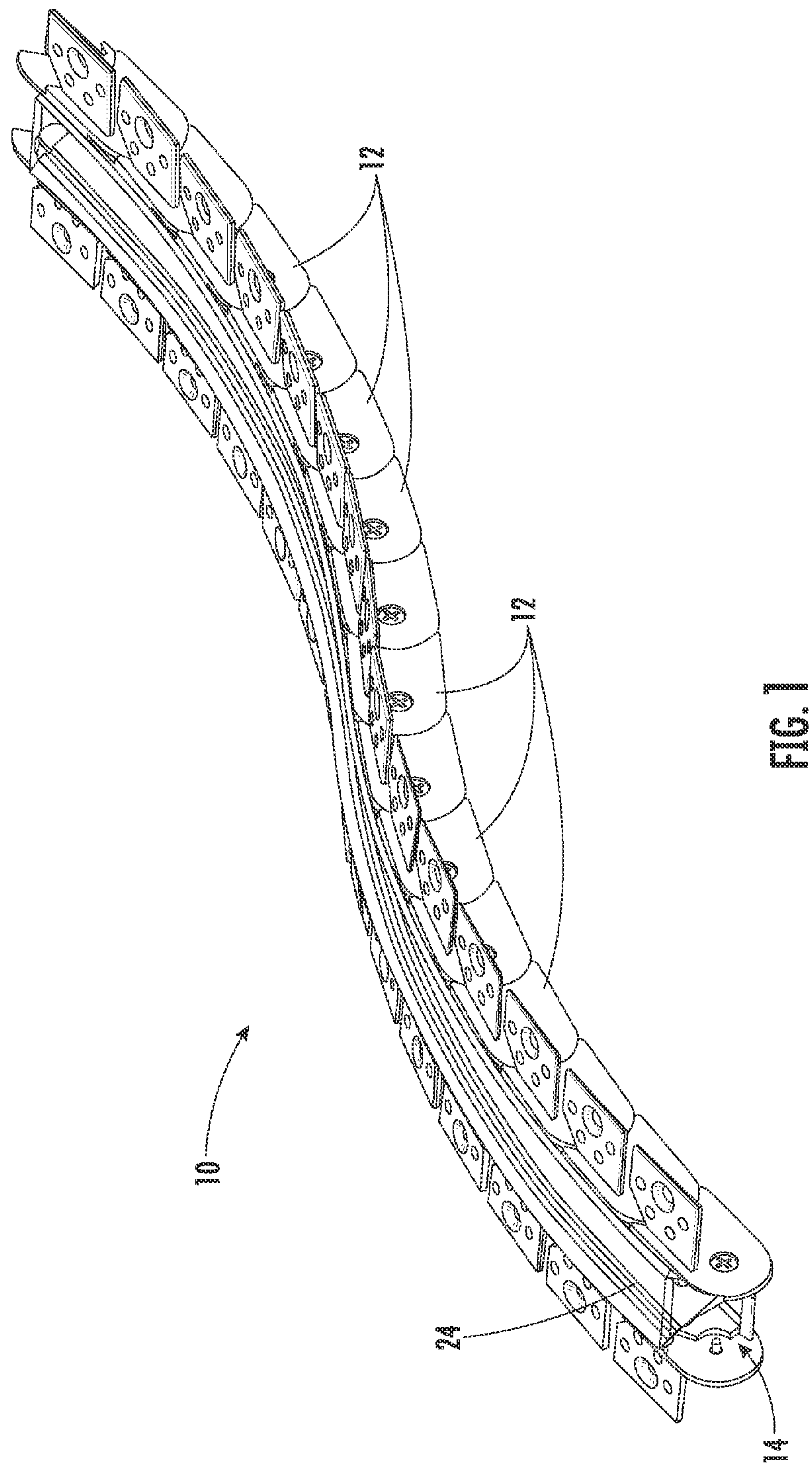
FIG. 1 is a front plan view of an embodiment of the disclosed lighting system.

While this invention is susceptible of embodiments in many different forms, there is shown in the drawings and will herein be described in detail at least one preferred embodiment of the invention with the understanding that the present disclosure is to be considered as an exemplification of the principles of the invention and is not intended to limit the broad aspect of the invention to any of the specific embodiments illustrated.

Referring to FIGS. 1-13, there is illustrated at least one embodiment of an articulated recessed channel lighting system, generally designated by the numeral 10. The particular illustrated lighting system 10 is for a curved surface, such as a rounded wall. While all the embodiments illustrated are described as being recessed within a wall or ceiling surface, it should be understood that the principles of the invention can be more broadly applied to any curved surface appropriate for a recessed lighting system.

As can be seen in FIG. 1, the system 10 is comprised of a plurality of linking sections 12 (also referred to herein as a "linkable section" in a deconstructed state) connected together to form an articulated channel 14. The linking sections 12 allow the system 10 to curve or undulate up and down, as needed.

Figure 2:
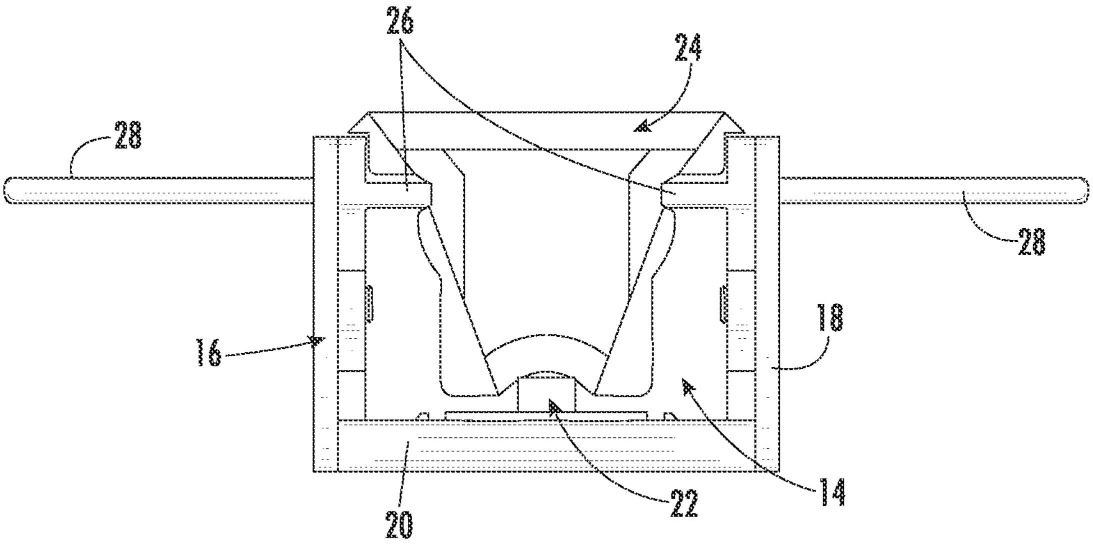
FIG. 2 is a side plan view of an embodiment of the disclosed lighting system.

Referring to FIG. 2, a more detailed view of the system components is provided. Each linkable section 12 comprises a first side wall 16, a second side wall 18, and a base wall 20 configured to form a U-shape. An LED strip 22 is positioned along an interior surface of the base wall 20 just beneath a flexible diffuser 24. The diffuser 24 is held within the channel 14 by inner flanges 26 extending inward from an interior surface of each side wall, 16 and 18. Outer flanges 28 extend outward from an exterior surface of each side wall, 16 and 18.

Figure 3:
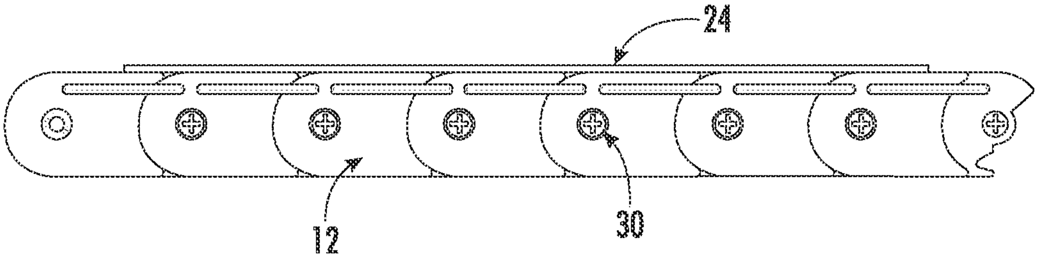
FIG. 3 is a perspective view of an embodiment of a single linking section for the disclosed lighting system.
Figure 4:
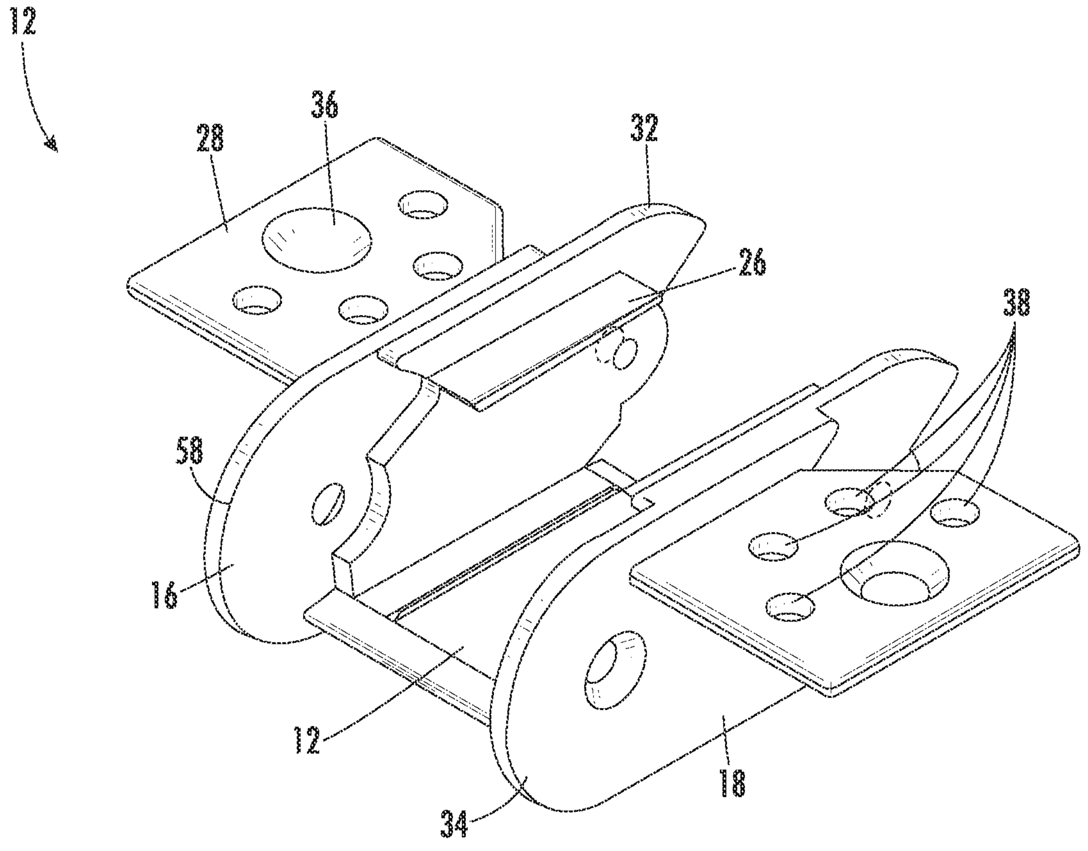
FIG. 4 is a top view of the linking section of FIG. 3.
Figure 5:
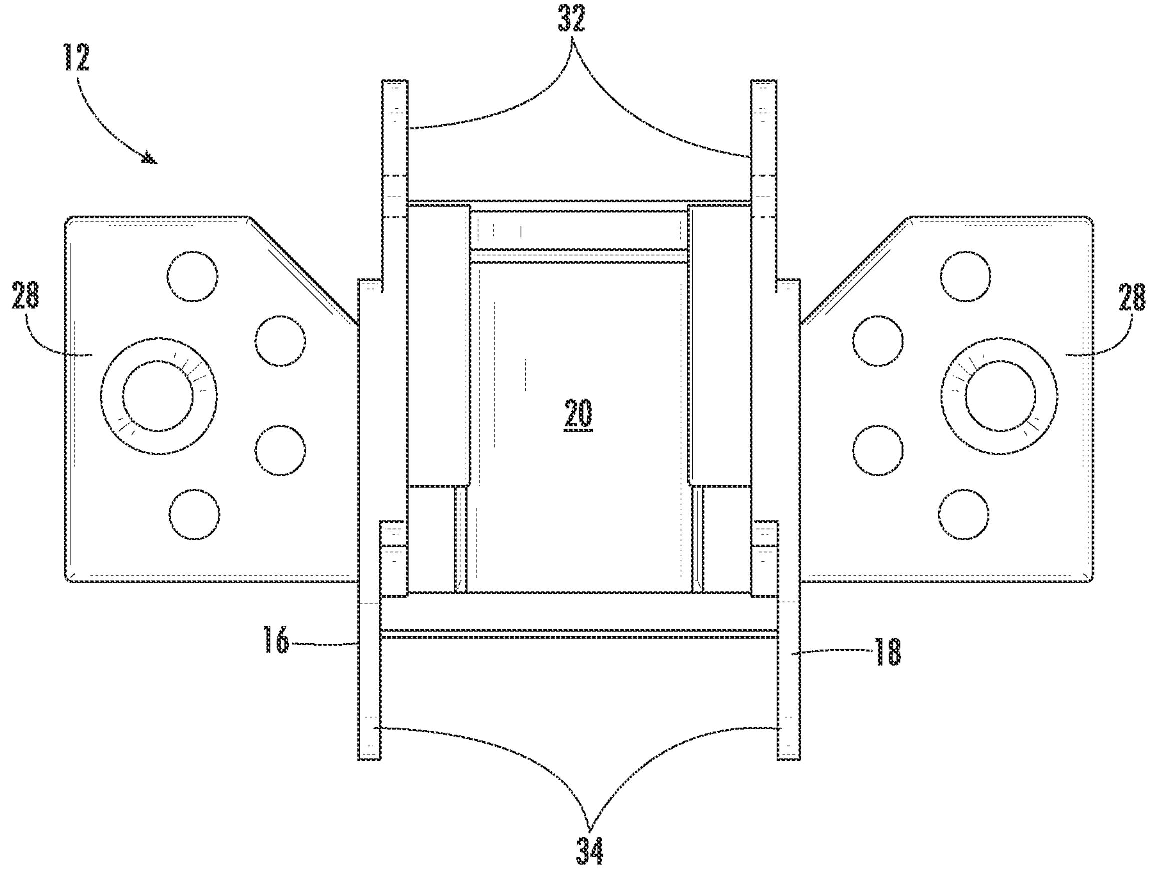
FIG. 5 is an exterior side view of the linking section of FIG. 3.
Figure 6:
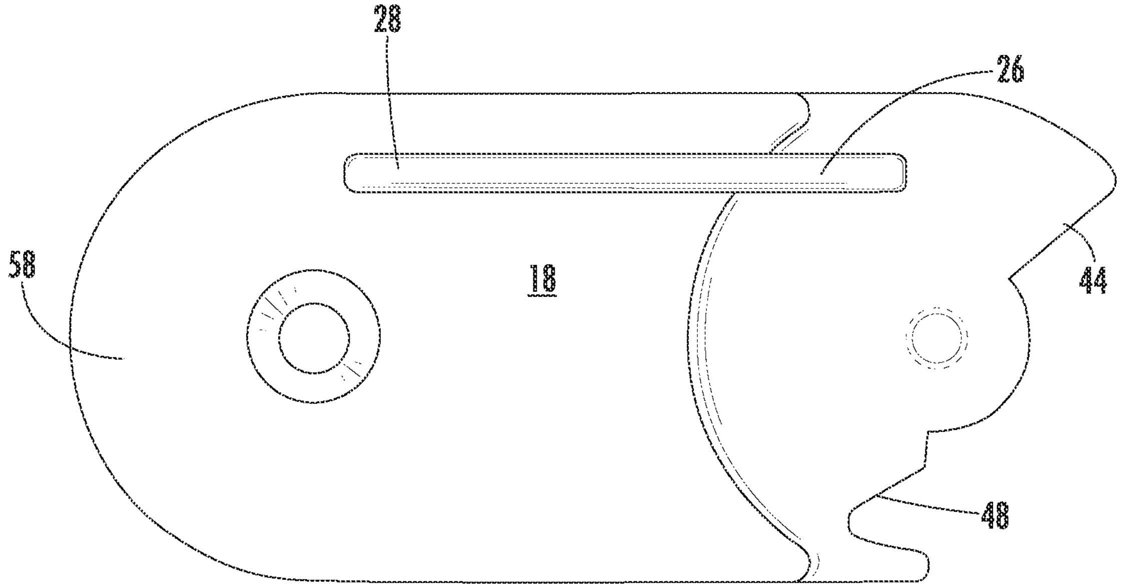
FIG. 6 is an interior side view of the linking section of FIG. 3.

FIG. 3 shows how each linkable section 12*a* is connected to another adjacent linkable section 12*b* using a pivot screw 30. The pivot screw 30 will allow rotating movement between the adjoined sections 12*a-b* without loosening, as will be described in further detail below.

With reference to FIGS. 4-7, different views of a single linkable section 12 are illustrated. Each linkable section 12 is identical so that the arrangement of sections 12*a-n* is simplified for customization. Each first and second side wall, 16 and 18, includes a first end 32 and an opposite second end 34. The first end 32 of each first side wall 16 and each second side wall 18 of a linkable section 12*a* is configured to pivotably connect to a second end 34 of a first side wall 16 and second side wall 18, respectively, of another linkable section 12*b* to align the U-shape and form the channel 14.

As noted above, each linkable section 12 includes at least a first outer flange 28 attached perpendicularly to an outside surface of the first side wall 16. Preferably, a second outer flange 28 is attached perpendicularly to an outside surface of the second side wall 18 as well. These outer flanges 28 are used to secure the system 10 to a surface in which it is recessed. Screw holes 36 are provided in each of the outer flanges 28 for this purpose. The remaining openings 38 on the outer flanges 28 provide retention of a building material, for example joint compound, to help conceal the lighting structure.

The inner flanges 26, of which there are preferably two, are provided to retain the flexible diffuser 24 within the channel 14. As shown in FIG. 2, the diffuser 24 has a slot 40 on each side, just below the upper surface 42, for positioning about the inner flanges 26. Further, the inner flanges 26 have slightly curved top and bottom surfaces to allow the flexible diffuser 24 to adapt to the curves made by the system 10.

Figure 7:
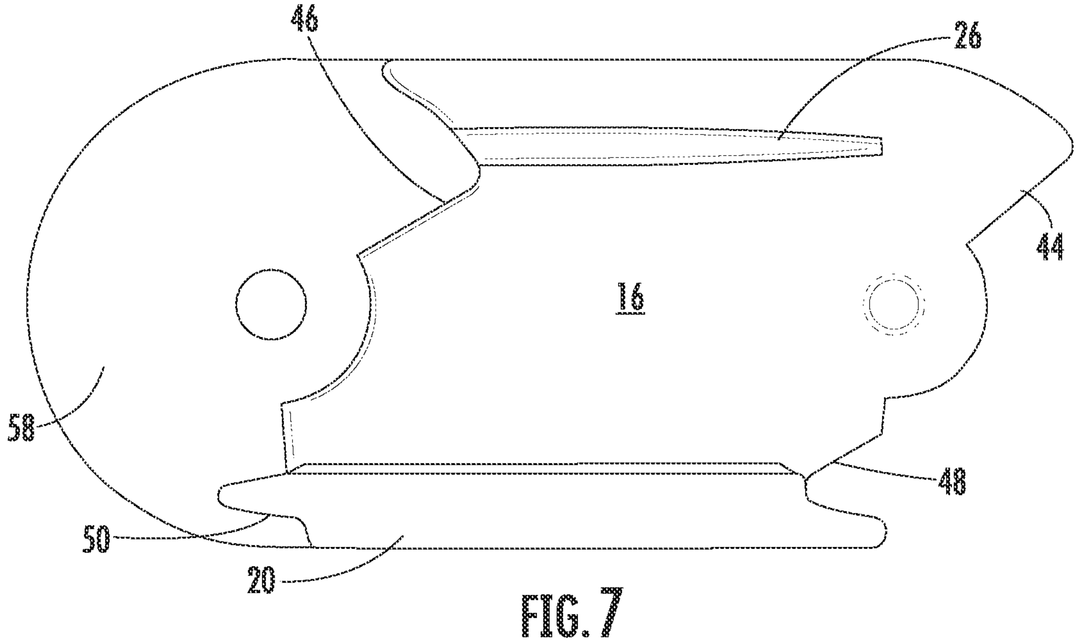
FIG. 7 is an interior side view of two linking sections of FIG. 3 connected together.
Figure 8:
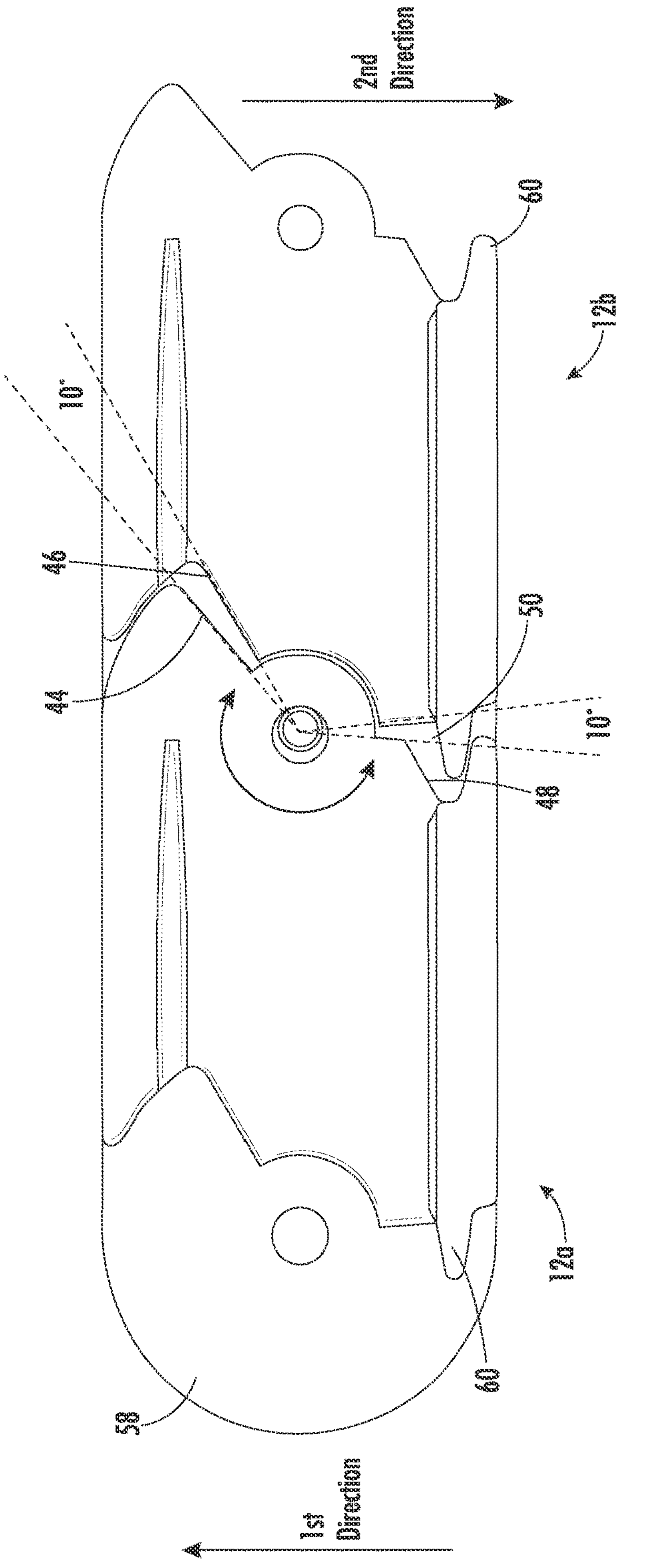
FIG. 8 is a perspective view of an embodiment of an articulated channel created by connecting a plurality of linking sections.

While the articulated system 10 can curve in two directions, it has limiting mechanisms. As shown in FIGS. 7 and 8, each linkable section 12 includes first complementary edges 44 on the first end 32 of each of the first side wall 16 and the second side wall 18, and second complementary edges 46 on the second ends 34 of each of the first side wall 16 and the second side wall 18. When two adjacent linking sections 12*a-b* are connected, the first complementary edges 44 and second complementary edges 46 cooperatively limit pivoting between adjacent linkable sections in a first direction. As shown, as the connected linking sections 12*a-b* are pivoted upward (e.g., a first direction), the first complementary edge 44 will eventually contact the second complementary edge 46 and any further pivoting in that direction is prohibited. Preferably, the limit on pivoting is within a range of from 5 to 15 degrees, as measured from an aligned position. Most preferably, the pivot is limited to 10 degrees.

Similarly, each linkable section 12 includes third complementary edges 48 on the first end 32 of each of the first side wall 16 and the second side wall 18, and fourth complementary edges 50 on the second end 34 of each of the first side wall 16 and the second side wall 18. The third complementary edges 48 and fourth complementary edges 50 of adjacent linking sections 12*a-b* are configured to cooperatively limit pivoting in a second direction opposite the first direction. As shown, as the connected linking sections 12*a-b* are pivoted downward (e.g., a second direction), the third complementary edge 48 will eventually contact the fourth complementary edge 50 and further pivoting in that direction is prohibited. Preferably the pivot is limited to within a range of from 5 to 15 degrees, as measured from an aligned position. Most preferably, the pivot is limited to 10 degrees.

Because the two limiting mechanisms operate in opposite directions (i.e., +5 to 15 degrees), the range of motion is additive. Accordingly, these limiting mechanisms can maintain the total range of motion between adjacent sections 12*a-b* to between 10 degrees and 30 degrees. The ability of the flexible diffuser 24 to curve without distortion may also factor into limiting range of motion.

While the configuration and design of the limiting mechanisms (i.e., complementary edges 44, 46, 48, and 50) are preferred for the illustrated embodiment of the system 10, other designs and configurations which achieve the function of limiting pivoting between adjacent sections 12*a-b* are certainly possible. Such alternate configurations and designs should be considered to fall within the scope of the appended claims.

Figure 9:
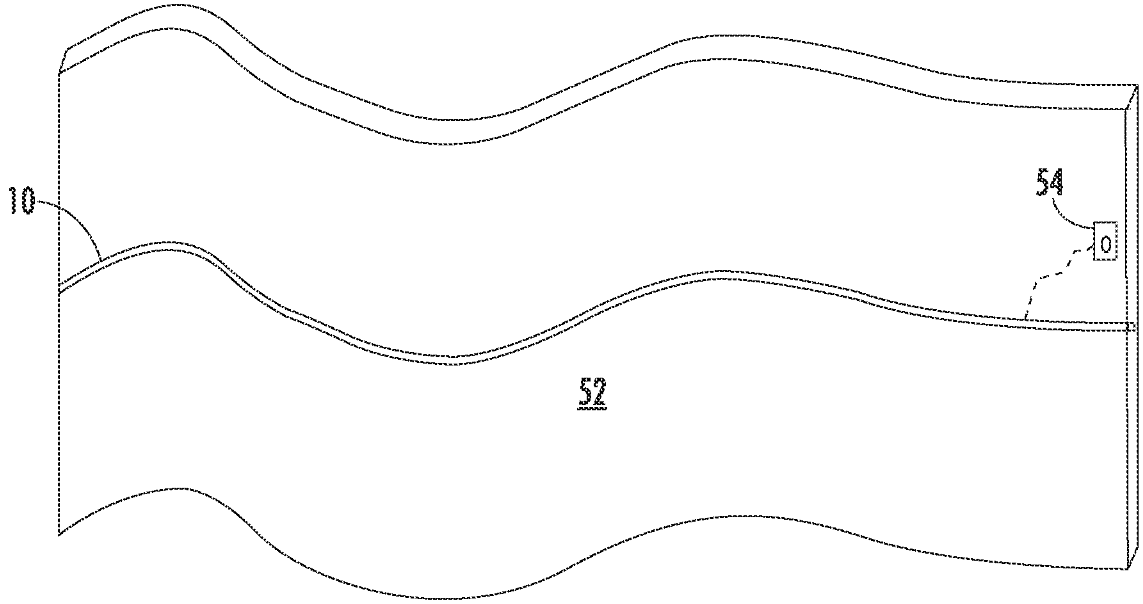
FIG. 9 is a perspective view of a exemplary curved wall surface illustrating an embodiment of the disclose lighting system recessed therein.
Figure 10:
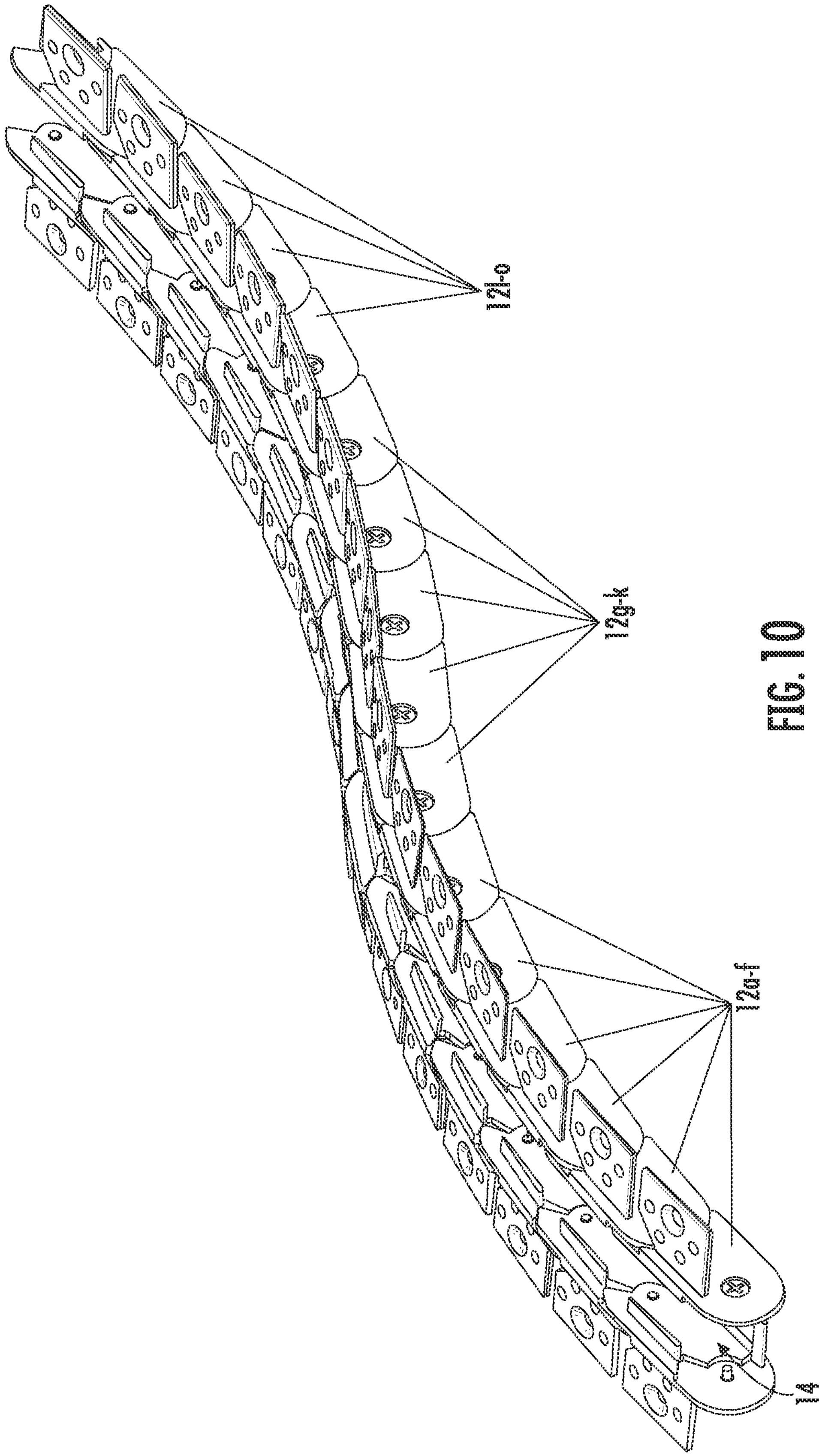
FIG. 10 is a perspective view of an embodiment of a flexible diffuser used in the disclosed channel lighting system.
Figure 11:
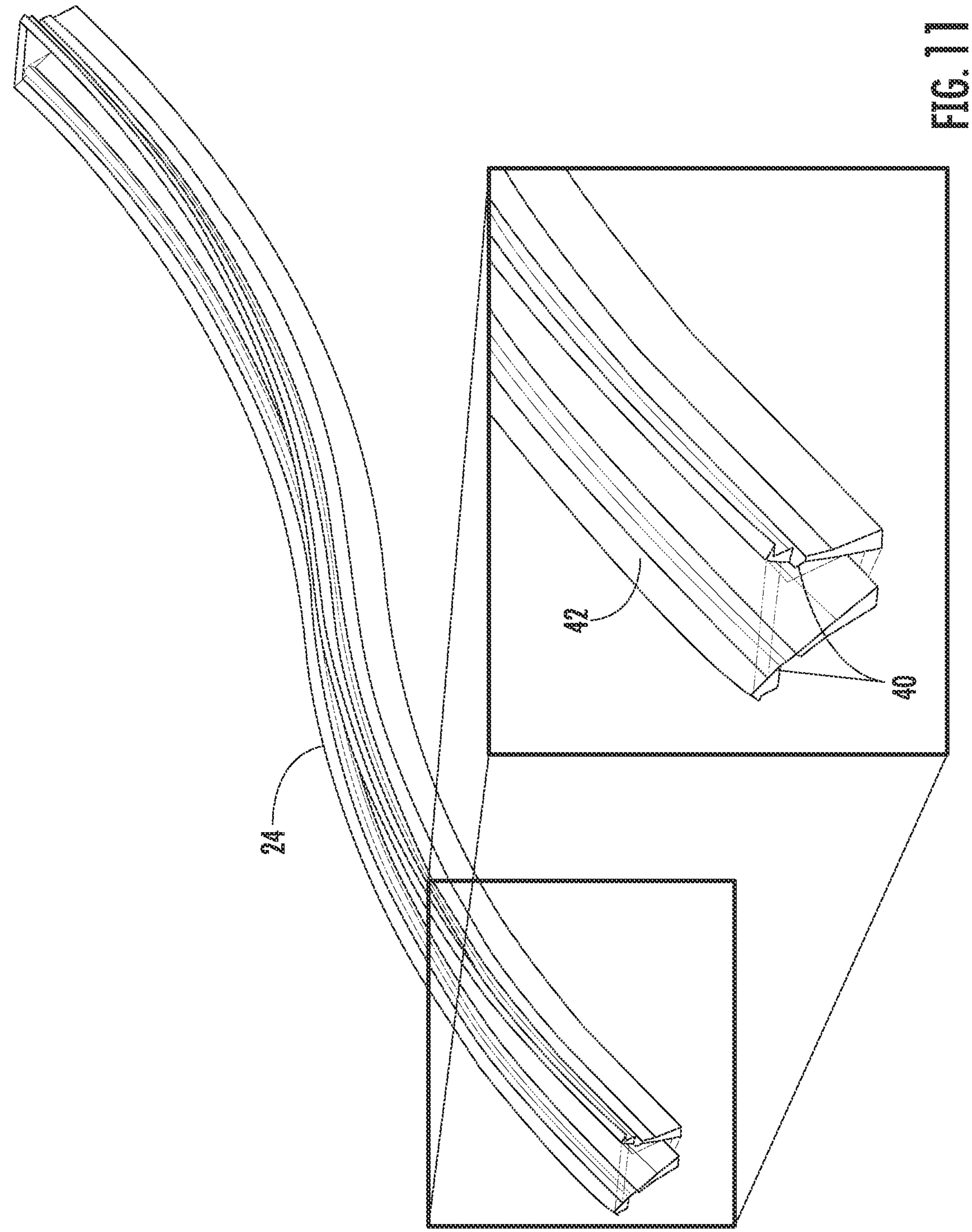
FIG. 11 is a perspective view of an embodiment of a recessed channel lighting system in accordance with the present disclosure.
Figure 12:
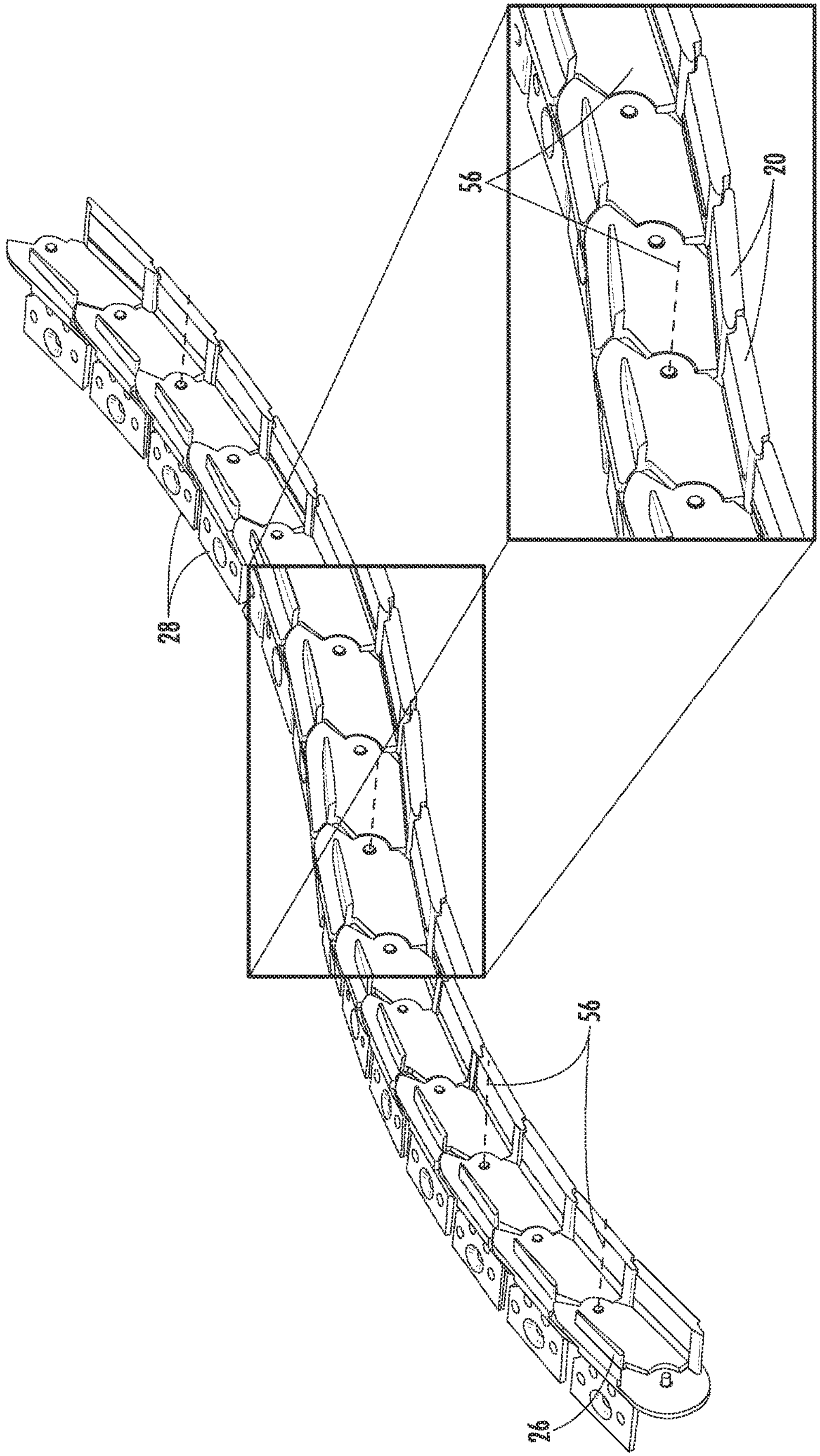
FIG. 12 is a partial view of one-half of the embodiment of FIG. 8 with a close-up of the channel interior.
Figure 13:
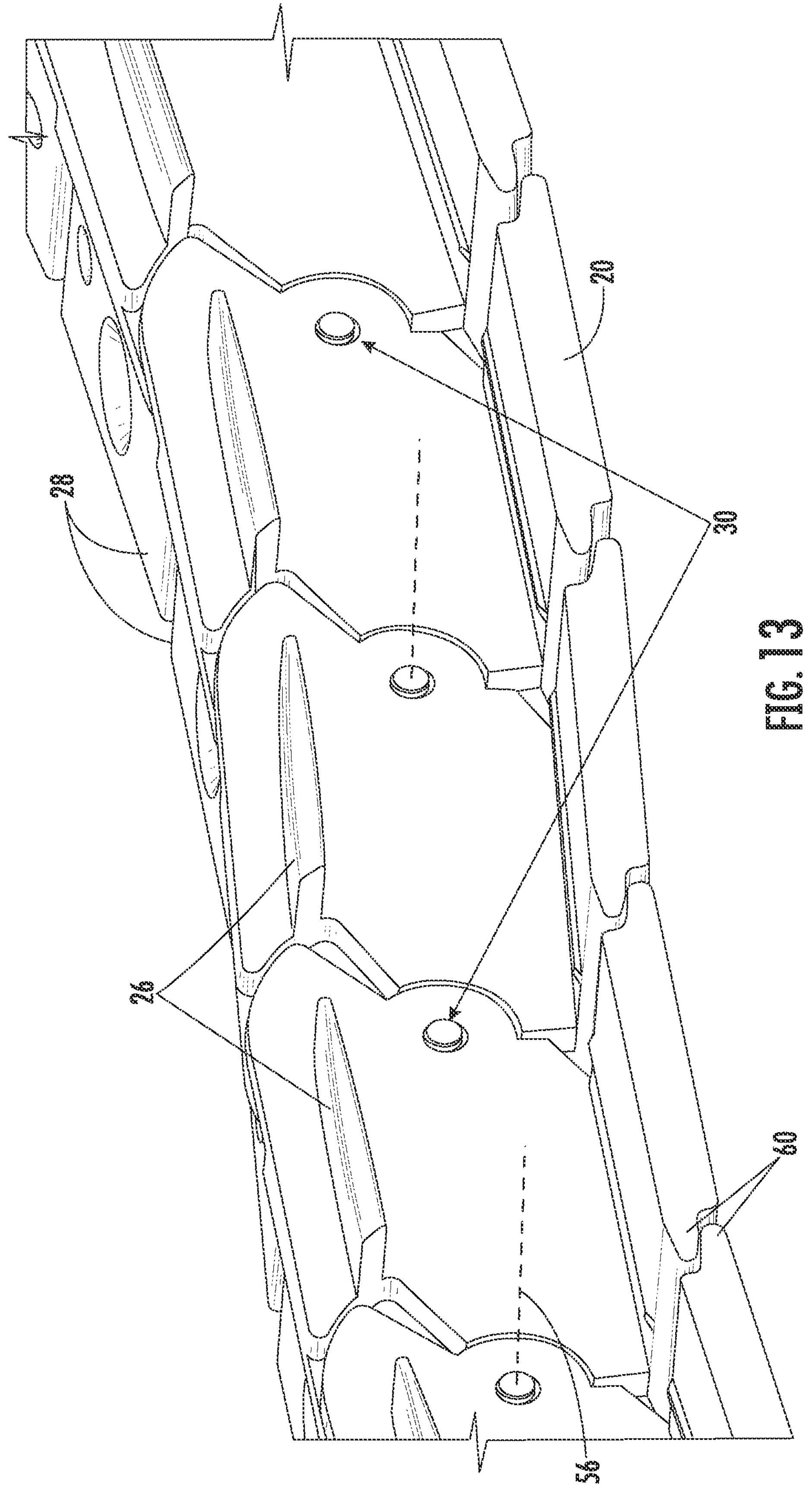
FIG. 13 is an enlarged view of the close-up window from FIG. 12.

FIG. 9 provides an example of an embodiment of the disclosed recessed lighting system 10 positioned within a curved wall 52. In this manner, the LED strip within the channel 14 can be easily connected (dashed line) to a control switch 54 and power supply (not shown), as is known by those of skill in the art.

Referring now to FIGS. 10-13, a length of assembled linking sections 12*a-p* and components of the lighting system 10 are illustrated. The assembly is comprised of 15 linking sections 12*a-p* connected to form an articulated channel 14. Obviously, the number of linking sections is practically unlimited. Once assembled, the LED strip 22 can be positioned along the base wall 20 within the channel 14 and a flexible diffuser 24 can be inserted within the channel 14 above the LED strip 22, as previously described.

The recessed channel lighting system 10 is shown to be pivotable vertically between adjacent sections 12*a-b* about an axis 56 perpendicular to the first side wall 16 and second side wall 18. This axis 56 is created by the assembly screws 30 used at each connecting point. And, for many municipal code compliance purposes, it is important to keep the LED strip enclosed within the channel 14. Accordingly, the second end 34 of each first side wall 16 and each second side wall 18 comprises an overlapping portion 58 which conceals the first and second complementary edges, 44 and 46, as well as the third and fourth complementary edges, 48 and 50. The base wall 20 is also uniquely configured with complementary protuberances 60 on each end which overlap to keep the channel 14 enclosed regardless of the curve radius of the system 10.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A recessed channel lighting system comprising:

a plurality of linking sections, each linking section comprising:

a first side wall and a second side wall, each first and second side wall having a first end and a second end, a base wall positioned between the first side wall and second side wall to form a U-shape, wherein the first end of each first side wall and each second side wall pivotably connects to the second end of a first side wall and second side wall, respectively, of an adjacent linking section to align the U-shape and form a channel, and the first end of each of the first side walls and the second side walls has a first complementary edge and the second end of each of the first side walls and the second side walls has a second complementary edge, and the first complementary edge and second complementary edge of adjacent linking sections cooperatively limit pivoting between adjacent linking sections in a first direction to within a range of from 5 to 15 degrees measured from an aligned position; and an LED strip positioned along the base wall within the channel of the plurality of linking sections.

2. The recessed channel lighting system of claim 1, further comprising a flexible diffuser positioned within the channel above the LED strip.

3. The recessed channel lighting system of claim 1, further comprising a first flange attached perpendicularly to an outside surface of the first side wall of each linking section.

4. The recessed channel lighting system of claim 3, further comprising a second flange attached perpendicularly to an outside surface of the second side wall of each linking section.

5. The recessed channel lighting system of claim 1, wherein adjacent linking sections are pivotable about an axis perpendicular to the first side wall and second side wall.

6. The recessed channel lighting system of claim 1, wherein the first complementary edge and the second complementary edge of adjacent linking sections cooperatively limit pivoting between adjacent linking sections to 10 degrees measured from an aligned position.

7. The recessed channel lighting system of claim 1, wherein the first end of each of the first side walls and the second side walls has a third complementary edge and the second end of each of the first side walls and the second side walls has a fourth complementary edge, and the third complementary edge and fourth complementary edge of adjacent linking sections cooperatively limit pivoting between adjacent linking sections in a second direction opposite the first direction to within a range of from 5 to 15 degrees measured from an aligned position.

8. The recessed channel lighting system of claim 7, wherein the third complementary edge and fourth complementary edge of adjacent linking sections cooperatively limit pivoting between adjacent linking sections is 10 degrees measured from an aligned position.

9. The recessed channel lighting system of claim 1, wherein the second end of each first side wall and each second side wall comprises an overlapping portion which conceals the first and second complementary edges.

10. The recessed channel lighting system of claim 7, wherein the second end of each first side wall and each second side wall comprises an overlapping portion which conceals the first, second, third, and fourth complementary edges of each side wall.

11. A linkable section for a recessed channel lighting system, the linkable section comprising:

a first side wall and a second side wall, each first and second side wall having a first end and a second end, a base wall positioned between the first side wall and second side wall to form a U-shape, wherein the first end of each first side wall and each second side wall is configured to pivotably connect to the second end of a first side wall and second side wall, respectively, of another linkable section to align the U-shape and form a channel; and wherein the first end of the first side wall and the second side wall each has a first complementary edge and the second end of the first side wall and the second side wall each has a second complementary edge, and the first complementary edge and second complementary edge of adjacent linkable sections are configured to cooperatively limit pivoting between adjacent linkable sections in a first direction to within a range of from 5 to 15 degrees measured from an aligned position.

12. The linkable section for a recessed channel lighting system as set forth in claim 11, further comprising a first flange attached perpendicularly to an outside surface of the first side wall.

13. The linkable section for a recessed channel lighting system as set forth in claim 12, further comprising a second flange attached perpendicularly to an outside surface of the second side wall.

14. The linkable section for a recessed channel lighting system as set forth in claim 11, wherein the first complementary edge and the second complementary edge of adjacent linkable sections are configured to cooperatively limit pivoting between adjacent linkable sections to 10 degrees measured from an aligned position.

15. The linkable section for a recessed channel lighting system as set forth in claim 11, wherein the first end of the first side wall and the second side wall each has a third complementary edge and the second end of the first side wall and the second side wall each has a fourth complementary edge, and the third complementary edge and fourth complementary edge of adjacent linkable sections is configured to cooperatively limit pivoting between adjacent linkable sections in a second direction opposite the first direction to within a range of from 5 to 15 degrees measured from an aligned position.

16. The linkable section for a recessed channel lighting system as set forth in claim 15, wherein the third complementary edge and fourth complementary edge of adjacent linkable sections is configured to cooperatively limit pivoting between adjacent linkable sections to 10 degrees measured from an aligned position.

* * * * *